Patented Mar. 13, 1928.

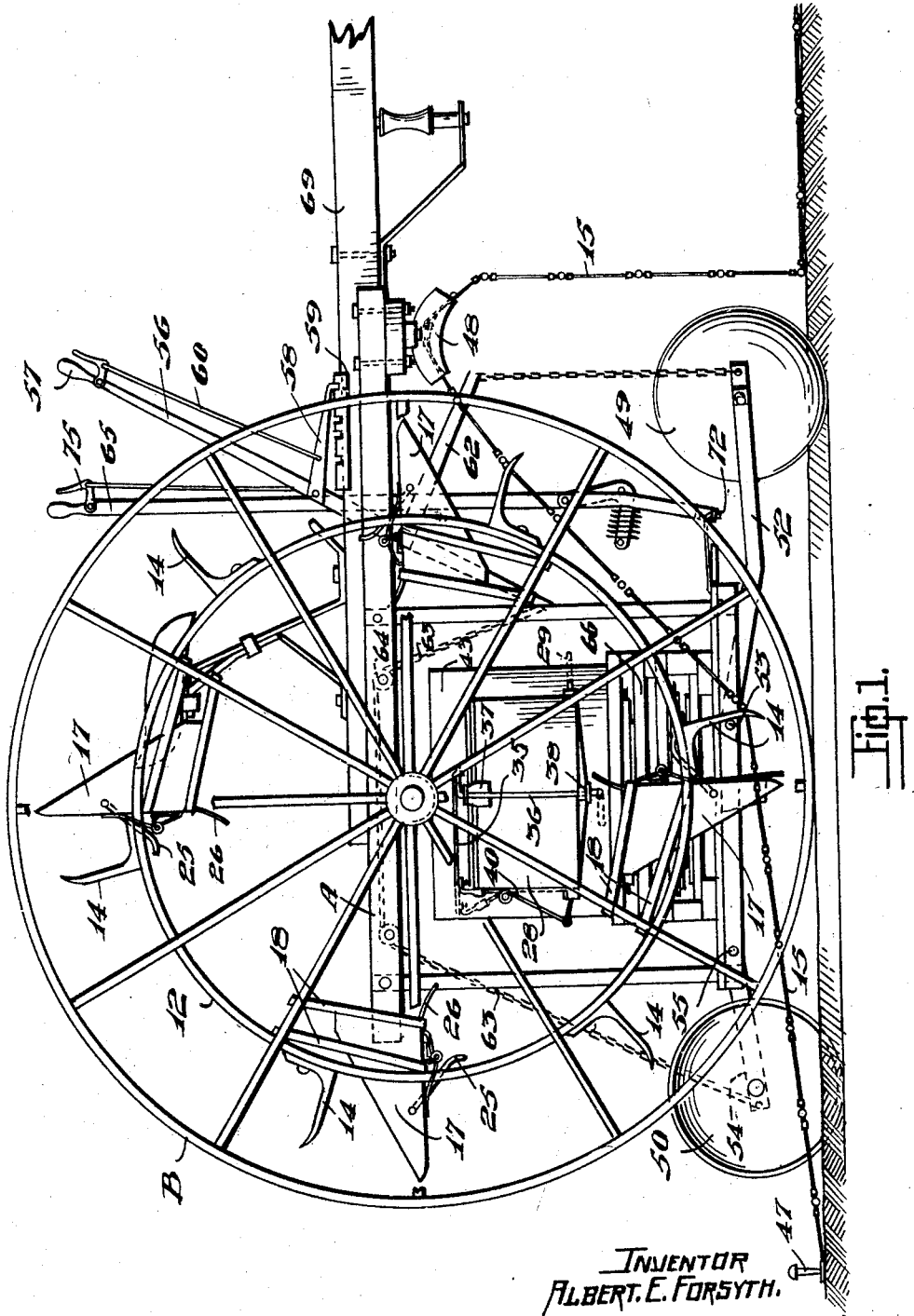

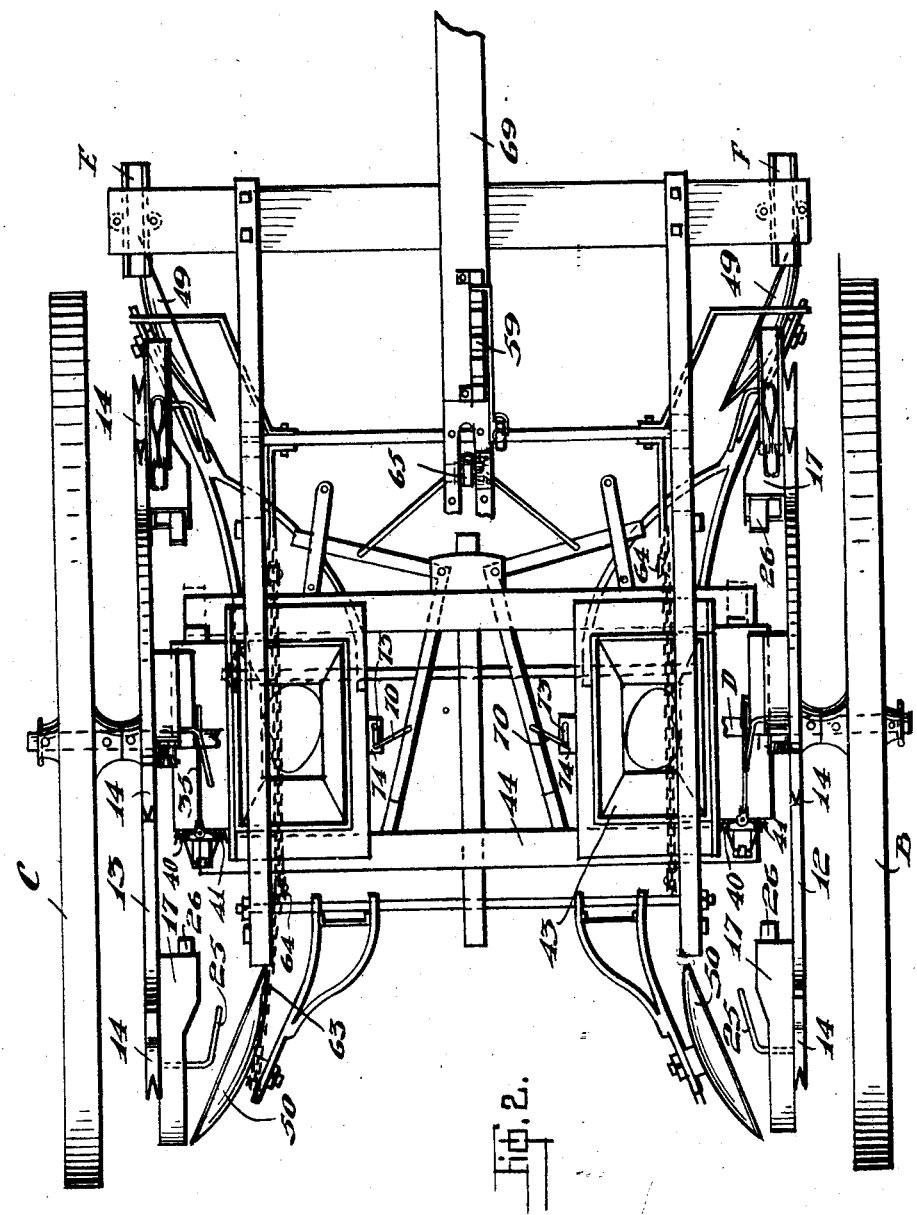

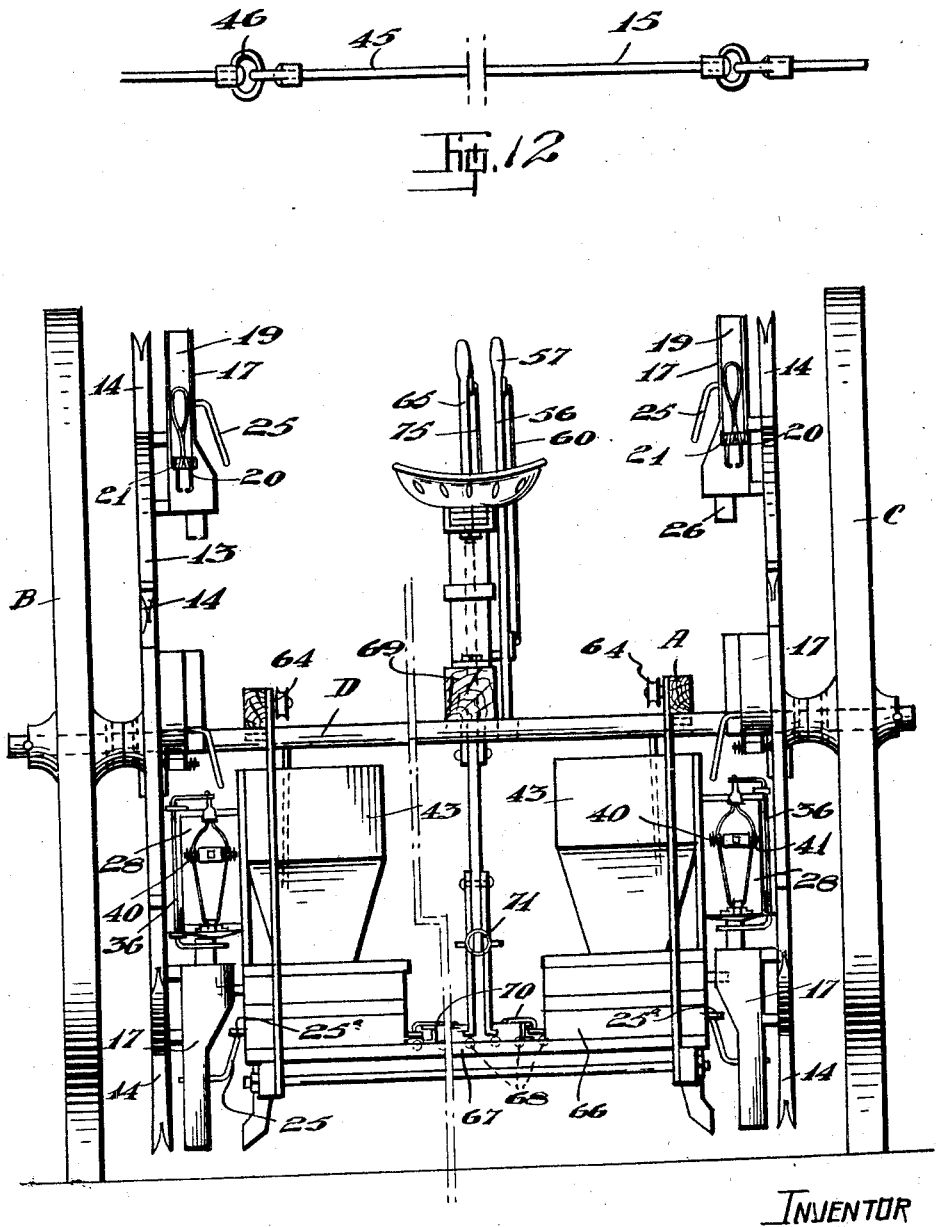

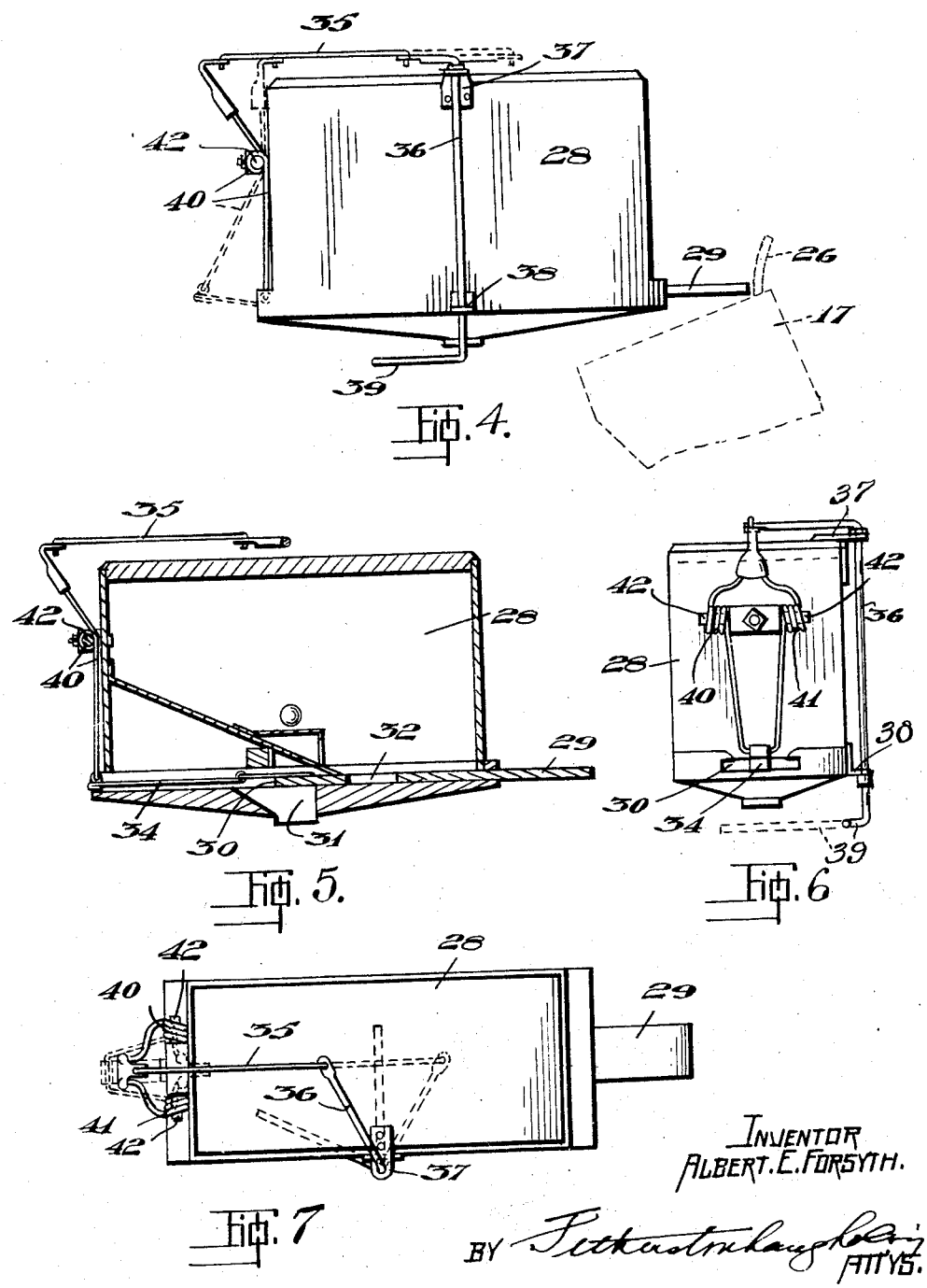

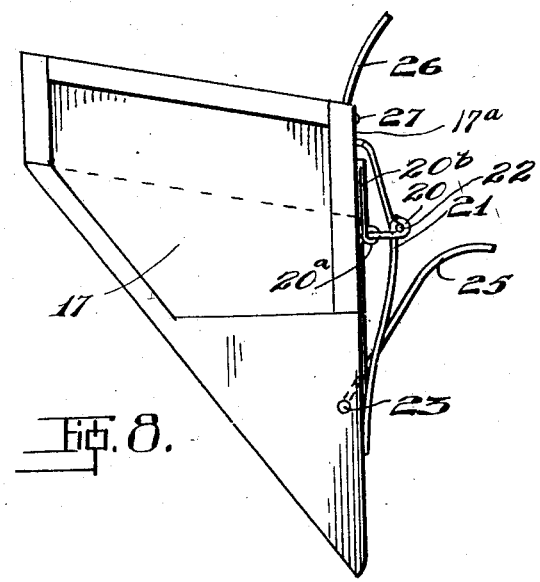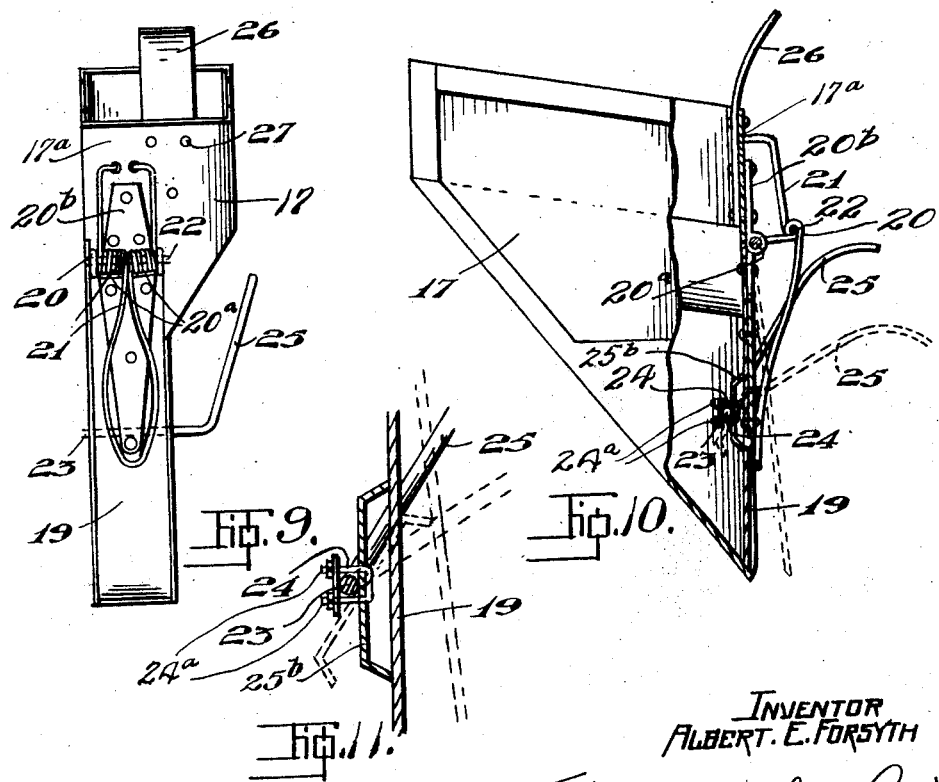

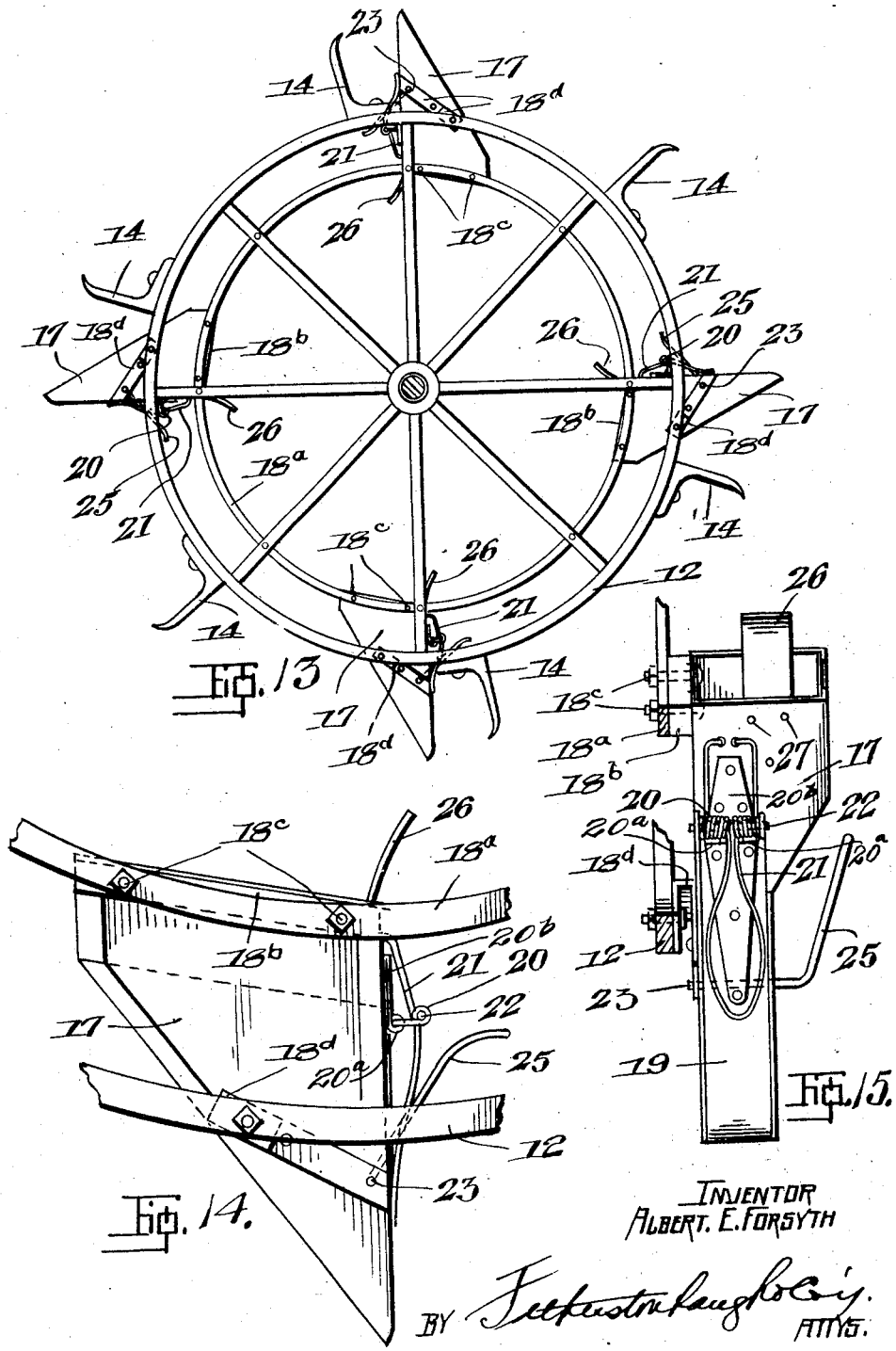

1,662,307

UNITED STATES PATENT OFFICE.

ALBERT EDWIN FORSYTH, BELLAMY, ONTARIO, CANADA.

CORN PLANTER.

Application filed October 11, 1922. Serial No. 593,872.

This invention relates to improvements in corn planters, and the objects of the invention are to provide a check-row machine of simple, efficient and inexpensive construction for planting corn and distributing fertilizer in regulated quantities and at equally spaced intervals.

Further objects are to provide a machine for sowing the corn in hills equally spaced and aligned in every direction similar to a checker-board so that the corn can be cultivated in every direction, this being due entirely to the accurate and simple means provided for checking the rows in combination with the mechanism for seeding.

A still further object is the provision of a machine of this kind in which only a single cable is used and in which all adjustments are made not with or through the cable, but through the pockets on the pocket wheels by adding to or taking therefrom. This is a distinctive feature and an improvement over machines heretofore and at present in use in which adjustments are and have been made entirely by means of cables.

Still other objects are to provide a machine of this kind in which the tripping instead of being done by the cable is performed by the seed pockets.

Still further objects are the provisions of a light-draft, durable machine without any complicated parts and that can be made and marketed at a saving of approximately forty per cent of the cost of the machines at present in use.

With the foregoing and other objects in view, the invention consists essentially of the improved combination and arrangement of parts described in the present specification and illustrated by the accompanying drawings that form part of the same.

Referring to the drawings, in which like characters of reference indicate corresponding parts in each figure, and in which:

Figure 1 is a side elevation of the machine.

Figure 2 is a top plan view.

Figure 3 is a rear elevation with front and rear discs removed for clarity.

Figure 4 is a side elevation of the seed box.

Figure 5 is a longitudinal section of the seed box.

Figure 6 is an end view of the same, showing in full lines the position of the lever when the seed box is closed.

Figure 7 is a top plan view.

Figure 8 is a side elevation of one of the seed pockets.

Figure 9 is an end elevation.

Figure 10 is a side view partly in elevation and partly in section of the pocket.

Figure 11 is a sectional detail of the pocket mechanism.

Figure 12 is a view of the section of the cable showing the links.

Figure 13 is a side elevation of a modified form of the pocket wheel showing instead of the pocket supporting brackets 18 a continuous inner rim to which the pockets are secured.

Figure 14 is a side elevation of the modified form of pocket adapted to fit the modified pocket wheel as shown in Figure 16.

Figure 15 is an end elevation of the modified form of pocket.

In the drawings, A indicates a suitable frame supported on wheels B and C and adapted to be motor driven or drawn as here shown by suitable tractive means such as horses which may be connected to the tongue. D is the axle on which the wheels B and C are loosely mounted, while fixedly mounted thereon are pocket wheels 12 and 13 of lesser diameter than the tractor wheels and provided on their peripheries at spaced intervals with projecting forked members 14 designed to engage with the spaced linked joints of a marking cable 15, hereinafter more fully described.

Adjacent to these forked members 14 and carried on the inside of the pocket wheels are seed pockets 17 arranged at predetermined spaced intervals and adapted in operation to deposit or discharge the seed-corn in regulated quantities and at equally spaced intervals. These pockets are adapted to project beyond the periphery of the wheels and slightly beyond the forked or cable-gripping members 14 and, without touching the ground, are designed to deposit the seed corn therein, as above mentioned.

The improved form of these pockets is shown in detail in Figures 8, 9, 10 and 11 and comprises a single hopper-shaped pocket 17 adapted to be supported from suitable cross-brackets 18 carried by the pocket wheels. For the distribution of seed each pocket is provided with a shutter or door 19, supported by the hinge 20ª the lower portion of which is riveted to the door 19, while the upper portion 20ᵇ is riveted to the stationary portion 17ª of the seed box. In order that the door 19 be normally retained in closed position I provide a spring 21, the loop end of which contacts with the door 19, while the centre portion is coiled around the suitably supported pin 22, to extend upwardly where the ends engage the portion 17ᵃ of the seed box. Adjacent the door 19 and supported in any suitable manner within the seed box, is a transversely extending lever 23, to which is secured by the U-shaped clip 24 the door operating cam 25ᵇ. As particularly illustrated in Figure 9, the lever arm 23 extends outwardly from the box and upwardly therefrom to form the lever 25. It will therefore be seen that as the lever 25 is moved or depressed downwardly, the cam 25ᵇ, with projection 25ᵃ, will cause the door 19 to open, as indicated by dotted lines in Figures 13 and 14, permitting the seed to be discharged. Then as the lever 25 is released, the action of the spring 21 will automatically close the door. 26 is an adjustable tappet member designed to operate the seed feed mechanism and is secured to the side of the pocket 17 by bolts 27 through a series of perforations in the side. The seed box is designated 28 and is adapted to feed the seed clear of the pockets 17 (see Figures 4, 5, 6 and 7) by means of mechanism comprising a reciprocally controlled side 29 mounted within a guideway 30 with openings 31 and 32 in the guideway and slide adapted to register at a certain point to permit passage of the seed corn. The slide 29 is spring held in normal position (see Figure 5) by a spring connected at one end to a link 34, and, at the other end, to a link member 35 in turn connected to a pivotally mounted rod 36 vertically supported by brackets 37 and 38 on the outside of the seed box and formed at the lower end with an arm 39 designed to contact with the tappet member 26 to ensure the return of the slide 29 to normal position.

The spring means, above mentioned, include spiral springs 40 and 41 having their ends extending downwardly to contact with the link 34, and upwardly to connect with the link 35. On the side of the box are pins 42 for mounting the springs. The opposite end of the slide to the spring-connected end is adapted to be engaged and moved inwardly by the tappet member 26.

The seed boxes are connected to fertilizer hoppers which, as they form the subject mater of a separate invention need not be described in detail beyond mentioning that they are pivotally adjustable and, as will be explained later, adapted to be moved inwardly to put the seeding mechanism out of operation, and outwardly to put the seeding mechanism into operation.

The marking cable 15 is formed of flexible material preferably as here shown of metal, and in short links 45 provided, also preferably, with swivel-joints 46. This cable is designed to engage with the forked members 14 one at a time and at a point just in front of the link joints.

The cable 15 is fixedly secured in the ground at one end by a pin 47 or otherwise and is then tensioned to engage with one of the fork members on the pocket wheel from whence it is loosely extended across the field remaining unsecured at its loose end.

Form the foregoing it will be seen that, when the machine travels forward on the loosely mounted tractor wheels B and C, pressure against this forward movement will be immediately exerted through the engagement of the cable with the pocket wheel by means of the forked members thereon, and that this pressure will cause the pocket wheels to rotate as the machine proceeds, thereby demonstrating the control of the cable over the pocket wheels. Moreover, as this operation continues and the forked members individually engage the cable, the seed pocket adjacent to the forked member in engagement with the cable is in position to deposit the seed corn neatly and surely in the space or hill for which it is intended.

Furthermore the rotation of the pocket wheels will cause the tappet member 26 to first engage with the slides 29, as illustrated in Figure 4, moving it inwardly to open position with the aperture 32 therein registering with the opening 31, permitting the seed to be delivered to the seed pocket. With the inward movement of the slide 29 the lever 39, through the bell crank 40—41 and links 34 and 35, assumes a position transverse to the line of travel of the machine, as illustrated in dotted lines in Figure 9, where it is in a position to be struck by the travelling tappet member 26 to cause it to assume a position parallel to the line of travel of the machine, at the same time operating through the bell crank lever and links the slide 29 to move outwardly to the closed position shown in Figures 4 and 5.

When the journey across the field is completed, the loose end of the cable is secured at the beginning of the next row and the machine turned about and driven back along the same cable, the end originally fixed remaining so until reached on the return journey without any disadvantage or deviation by the machine on account of the cable's slack.

While the above operation is proceeding, the disc means, which are hereinafter more fully described, are also operated to first trench the ground as the machine proceeds and then, after the seed corn and fertilizer is deposited, to close the trenches and complete the seeding operation.

65 is a second operating lever designed to control the gear of the feed boxes by moving the fertilizer hoppers 43 on which the former are mounted inwardly or outwardly. To maintain the pivotal point at which the fertilizer hoppers are adjusted or to move these hoppers inwardly so that the tappet members 26 will not operate the seed boxes. The hoppers are laterally adjustable by mounting the base boards 66 on a guideway 67, which may or may not have rollers 68 to support the hoppers. Inward movement of each hopper is performed by means of the lever 65 mounted on the tongue 69 and provided with cranks 70 having spring-actuating means 71. The cranks 70 are formed with downwardly turned ends 72 extending through slots 73 in suitable brackets 74 connected to the side of the base board 66.

From the foregoing, it will be seen that the coil spring 71 is designed to hold the hoppers and seed boxes securely in position while the machine is in operation. The backward movement of the lever 65 moves the hoppers and seed boxes into position with the pocket wheels for planting, and the forward movement of the lever retires the hoppers and the seed boxes from said wheels.

Referring to Figures 13, 14 and 15, and in which a modified form of pocket wheel and pocket are shown, it will be noted that the pocket wheels in Figure 13 is provided with a continuous inner rim 18ª to which the pockets 17 are secured and which constitutes supporting means independent of the pocket wheel spokes and whereby all adjustments are made through the pockets being added to or taken therefrom.

The modified form of pocket illustrated in Figures 14 and 15 to fit this construction entails some minor alterations in construction as shown at 18ᵇ in the block on the pocket designed to receive therethrough the securing bolts 18ᶜ, and lower down on the pocket, the bent arm 18ᵈ adapted, in combination with secure means therethrough and through the periphery of the wheel 12, 13, to hold the pocket in spaced relationship thereto.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:—

1. A seed dispensing device comprising a frame, a seed box mounted on the frame, a shaft rotatably mounted in said frame, a pocket wheel carried by said shaft, a plurality of spaced gripping members on the pocket wheel, a cable adapted to engage individually with said members to rotate the pocket wheels, a plurality of said pockets at spaced intervals on said wheel, an opening in the base of said seed box, an apertured slide adapted to open and close the base, operating mechanism for said slide including a lever, and a tappet carried by each seed pocket adapted in the rotation of said pockets to first engage with the slide to open the seed box and then engage with said lever to close said box, and means for opening the seed pockets simultaneously with the closing of the seed box.

2. The planter as claimed in claim 1, in which said operating mechanism comprises a bell crank lever fulcrumed upon one side of the box, a link connecting one arm of said bell crank lever with the slide, a second link connected to the other end of said bell crank lever, a lever rockably mounted on one side of the seed box having at one end a portion adapted, in one position of its movement, to assume a position underneath the seed box transverse to the direction of rotation of the wheel and, at another point of its movement, a position parallel with the direction of rotation, said lever having a portion connected at its other end with said second link.

In witness whereof I have hereunto set my hand.

ALBERT EDWIN FORSYTH.